(12) United States Patent
Kline et al.

(10) Patent No.: US 10,902,851 B2
(45) Date of Patent: Jan. 26, 2021

(54) RELAYING VOICE COMMANDS BETWEEN ARTIFICIAL INTELLIGENCE (AI) VOICE RESPONSE SYSTEMS

(71) Applicant: INTERNATIONAL BUSINESS MACHINES CORPORATION, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 150 days.

(21) Appl. No.: 16/190,788

(22) Filed: Nov. 14, 2018

(65) Prior Publication Data
US 2020/0152187 A1   May 14, 2020

(51) Int. Cl.
H04L 12/58 (2006.01)
H04M 1/725 (2006.01)
G10L 15/22 (2006.01)
G10L 15/30 (2013.01)

(52) U.S. Cl.
CPC .............. *G10L 15/22* (2013.01); *G10L 15/30* (2013.01); *G10L 2015/223* (2013.01); *H04L 51/02* (2013.01); *H04M 1/7255* (2013.01)

(58) Field of Classification Search
CPC ... G10L 15/22; G10L 15/30; G10L 2015/233; H04L 51/02; H04M 1/7255
See application file for complete search history.

(56) References Cited

U.S. PATENT DOCUMENTS

| | | |
|---|---|---|
| 8,271,287 B1 | 9/2012 | Kermani |
| 9,653,075 B1 | 5/2017 | Chen et al. |
| 2008/0228493 A1 | 9/2008 | Hu |
| 2015/0088518 A1 | 3/2015 | Kim et al. |
| 2017/0047067 A1 | 2/2017 | Geldbach et al. |
| 2017/0162198 A1 | 6/2017 | Chakladar et al. |
| 2017/0242657 A1 | 8/2017 | Jarvis et al. |
| 2019/0251975 A1* | 8/2019 | Choi ................ H04L 63/083 |
| 2020/0135200 A1* | 4/2020 | Taparia ............... G10L 15/22 |

OTHER PUBLICATIONS

Apple Developer, "Human Interface Guidelines," https://developerapple.com/watchos/human-interface-guidelines/user-interaction/siri/, retrieved Nov. 14, 2018, 11 pages.
Arduino Project Hub, "Voice Controlled Automation," https://create.arduino.cc/projecthub/abhijit-pattnaik/voice-controlled-home-automation-f1345f, Oct. 2016, 14 pages.
Erik Eckel, "Apple's Siri: A cheat sheet," https://www.techrepublic.com/article/apples-siri-the-smart-persons-guide/, Jun. 2018, 14 pages.
Jakub Miara, "Voice Commands Coordination Between the Same App on Multiple Devices," IPCOM000251389D; Oct. 2017, 5 pages.

* cited by examiner

*Primary Examiner* — Sonia L Gay
(74) *Attorney, Agent, or Firm* — Cantor Colburn LLP; Tihon Poltavets

(57) ABSTRACT

Described herein is an AI voice response system configured to and methods, computer-readable media, techniques, and methodologies for relaying a voice command received from a user unknown to the AI voice response system to another AI voice response system capable of identifying the user and executing the voice command. An execution result of executing the voice command is then sent back to the AI voice response system that received the voice command for presentation to the user.

20 Claims, 7 Drawing Sheets

RELAYING VOICE COMMANDS BETWEEN ARTIFICIAL INTELLIGENCE (AI) VOICE RESPONSE SYSTEMS

BACKGROUND

The present invention relates generally to artificial intelligence (AI) voice response systems, and more particularly, to relaying voice commands between AI voice response systems.

AI voice response devices capable of responding to user voice commands or requests are available from a variety of manufacturers and are becoming increasingly commonplace. Such devices are generally capable of responding to user requests for information or performing basic tasks in response to user commands such as adding items to a calendar, setting alarms/timers, placing voice or video calls, or the like. More recent advancements in AI voice response technology include the ability to perform more complex tasks such as placing a food order, making a restaurant reservation, contacting a ride-sharing service, or the like. Existing AI voice response systems, however, suffer from a number of drawbacks, technical solutions to which are described herein.

SUMMARY

In one or more example embodiments, a computer-implemented method for relaying a voice command between artificial intelligence (AI) voice response systems is disclosed. The method includes receiving, at a first AI voice response client device, the voice command from a user and determining, by the first AI voice response client device, that the user is unknown to a first AI back-end service accessible via the first AI voice response client device. The method further includes broadcasting, by the first AI voice response client device, a message including identifying information of the user and receiving, by the first AI voice response client device, a response to the message from a second AI voice response client device. The response to the message includes an indication that the user is known to a second AI back-end service accessible via the second AI voice response client device. The method additionally includes sending, by the first AI voice response client device, the voice command to the second AI voice response client device for execution by the second AI back-end service; receiving, by the first AI voice response client device from the second AI voice response client device, an execution result of executing the voice command; and presenting the execution result to the user via the first AI voice response client device.

In one or more other example embodiments, an AI voice response system configured to relay a voice command to another AI voice response system is disclosed. The AI voice response system includes a first AI back-end service and a first AI voice response client device configured to communicate with the first AI back-end service. The first AI voice response client device includes at least one memory storing computer-executable instructions and at least one processor configured to access the at least one memory and execute the computer-executable instructions to perform a set of operations. The operations include receiving the voice command from a user and determining that the user is unknown to the first AI back-end service. The operations further include broadcasting a message including identifying information of the user and receiving a response to the message from a second AI voice response client device. The response to the message includes an indication that the user is known to a second AI back-end service accessible via the second AI voice response client device. The operations additionally include sending the voice command to the second AI voice response client device for execution by the second AI back-end service; receiving, from the second AI voice response client device, an execution result of executing the voice command; and presenting the execution result to the user via the first AI voice response client device.

In one or more other example embodiments, a computer program product for relaying a voice command between AI voice response systems disclosed. The computer program product includes a non-transitory storage medium readable by a processing circuit, the storage medium storing instructions executable by the processing circuit to cause a method to be performed. The method includes receiving, at a first AI voice response client device, the voice command from a user and determining, by the first AI voice response client device, that the user is unknown to a first AI back-end service accessible via the first AI voice response client device. The method further includes broadcasting, by the first AI voice response client device, a message including identifying information of the user and receiving, by the first AI voice response client device, a response to the message from a second AI voice response client device. The response to the message includes an indication that the user is known to a second AI back-end service accessible via the second AI voice response client device. The method additionally includes sending, by the first AI voice response client device, the voice command to the second AI voice response client device for execution by the second AI back-end service; receiving, by the first AI voice response client device from the second AI voice response client device, an execution result of executing the voice command; and presenting the execution result to the user via the first AI voice response client device.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
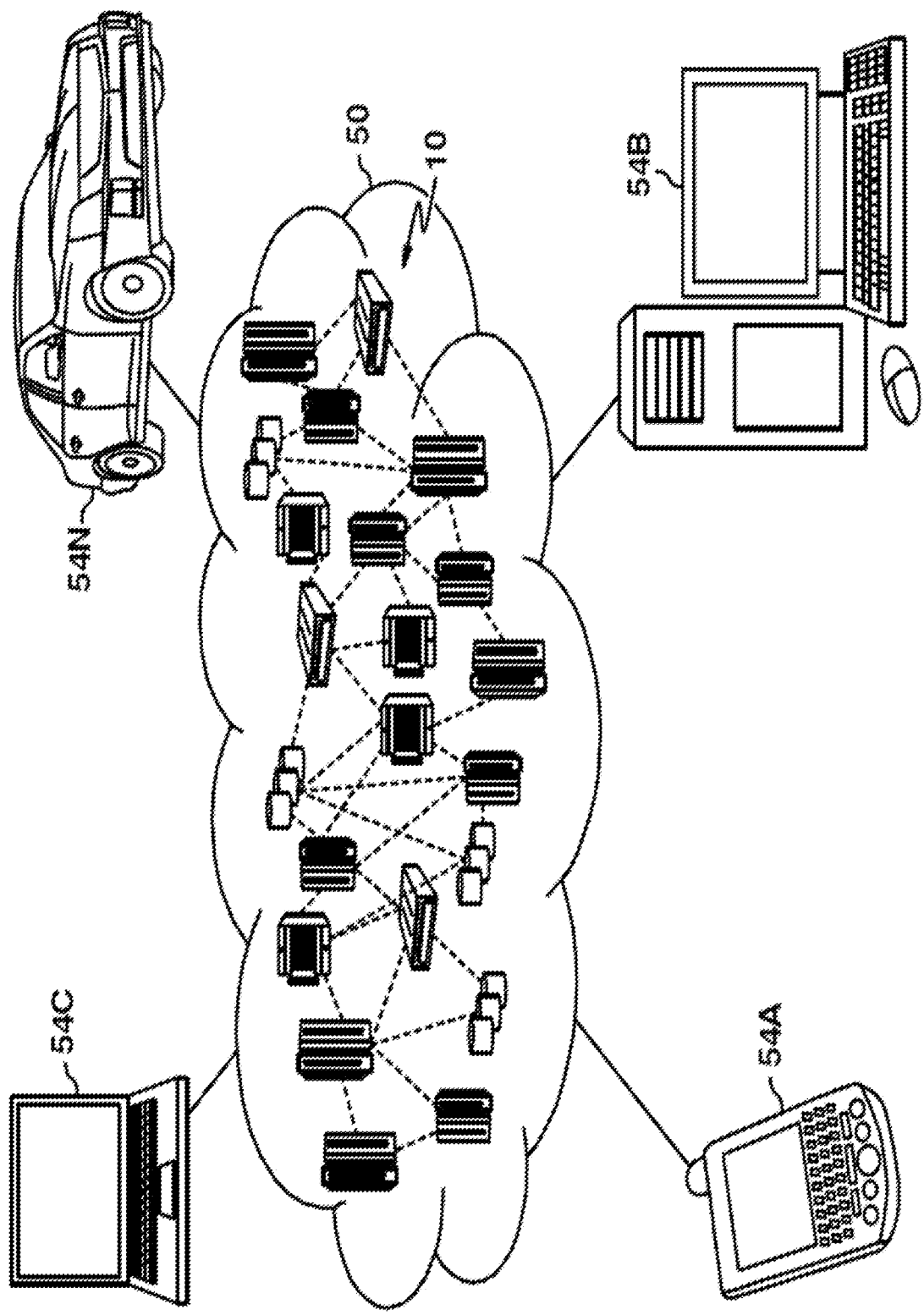
FIG. 1 depicts a cloud computing environment in accordance with one or more example embodiments of the disclosure.

Example embodiments relate to, among other things, an AI voice response system configured to and methods, computer-readable media, techniques, and methodologies for relaying a voice command received from a user unknown to the AI voice response system to another AI voice response system capable of identifying the user and executing the voice command. An AI voice response client device in accordance with example embodiments may be any suitable device capable of receiving input from a user (e.g., voice input, text input, etc.) and communicating with an AI back-end service to execute commands corresponding to the input and provide the results of the executed commands or an indication thereof back to the user as output. In general, an AI voice response client device in accordance with example embodiments may include a speaker, a microphone, and a display for receiving input from a user and providing output to the user. An AI voice response client device may be, without limitation, a smartphone, a tablet, a wearable device, a voice-enabled device not intended for mobile use, a desktop computer, a laptop computer, a gaming console, a content streaming device, or the like. While a user command submitted to an AI voice response client device may be described herein as a voice command, it should be appreciated that the user command can take on a variety of forms detectable by a AI voice response client device including a text-based command; a gesture-based command; or the like. In addition, an execution result may be provided as voice output from an AI voice response client device; rendered on a display of an AI voice response client device; presented via a different device communicatively coupled to an AI voice response device (e.g., rendered on a display of a different device); or the like.

In example embodiments, a first AI voice response client device receives a voice command from a user. The first AI voice response client device may send the voice command or some portion thereof to a first AI back-end service with which it is associated to determine if the user is a known user (e.g., a user having a user profile registered with the first AI back-end service). Alternatively, the first AI voice response client device may make this determination locally. The user may be unknown if, for example, the user submitted the voice command to another user's AI voice response client device.

Upon determining that the user is an unknown user, the first AI voice response client device may broadcast a message to one or more other AI voice response client devices within communication range of the first AI voice response client device. The one or more other AI voice response client devices may include at least one device associated with the user who submitted the voice command. The message may be broadcasted using any suitable communication protocol including, without limitation, WiFi, Bluetooth, or the like. As a non-limiting example use case scenario, a user may leave his phone in one room of his house and while present in another room of his house (where he is out of voice detection/recognition range of his phone) may submit a voice command to a friend's smartphone. In example embodiments, the friend's smartphone is incapable of handling the voice command because the user is not known (e.g., registered) to the AI back-end service accessible via the friend's smartphone. It should be appreciated that, in example embodiments, multiple different AI back-end services may be accessible via the friend's smartphone, and the user may be unknown to all of these back-end services. Upon determining that the user is an unknown user, the friend's smartphone may broadcast a message to other devices within communication range (including the user's phone in the other room) to attempt to identify another AI voice response client device to which the user is known.

In example embodiments, the broadcasted message includes identifying information of the user who submitted the voice command. For instance, the broadcasted message may include a voice signature of the user generated from the voice command that was submitted. The voice signature may be, for example, a voice snippet taken from the voice command. In other example embodiments, the identifying information included in the broadcasted message may be a name of the user, a nickname of the user, or some other form of identifying information (e.g., an authentication code; a password; a passphrase; a security question answer; etc.). In example embodiments, the AI voice response client device that receives the voice command and broadcasts the message prompts the user for the identifying information to include in the broadcasted message.

Upon receiving the broadcasted message containing the user's identifying information (e.g., a voice signature of the user), an AI voice response client device may communicate with an associated AI back-end service to determine if the user can be identified as a known user based on the information contained in the broadcasted message. If the user is recognized as a known user to an AI voice response system, the associated AI voice response client device (e.g., a second AI voice response client device) may send a response to the first AI voice response client device that broadcasted the message that indicates that the user is known to an AI back-end service accessible via the second AI voice response client device.

In example embodiments, the broadcasted message may be received by multiple AI voice response client devices to which the user is known. For instance, referring again to the example use case scenario introduced earlier, the message broadcast by the friend's smartphone may be received by the user's smartphone as well as by a stationary AI voice response client device associated with the user, each of which may be located at a respective distance from the user that prohibits the user from directly issuing the voice command to either of these devices. In example embodiments where there are multiple AI voice response client devices to which the user is known, only one device may respond back to the AI voice response client device that broadcast the message. In example embodiments, the multiple AI voice response client devices to which the user is known may collaboratively determine based on selection criteria which device to select for responding back to the broadcasted message. In example embodiments, the selection criteria may specify a default device for responding to the broadcasted message. For instance, referring again to the example use case scenario introduced earlier, the user's smartphone (as opposed to the stationary AI voice response client device) may be the default AI voice response client device for responding to the broadcasted message. In other example embodiments, the selection criteria may dictate that the device with the smallest network latency or the device with the lowest network communication cost (e.g., cellular network data charges) is the device to select for responding to the broadcasted message. It should be appreciated that the above examples of selection criteria that can be evaluated are merely illustrative and not exhaustive.

In other example embodiments, the device that broadcasts the message (e.g., the first AI voice response client device that receives that voice command from the unknown user) may select a device to receive the voice command for execution from among multiple AI voice response devices that respond to the broadcasted message. Similar to the collaborative determination described above with respect to the devices that receive the broadcasted message, the broadcasting device may select a particular device to receive the voice command based on selection criteria, which may include, without limitation, selection of a default device or selection of a device that is most proximal to the broadcasting device.

Upon receiving this response, the first AI voice response client device may send the complete voice command to the second AI voice response client device. Upon receipt of the voice command, the second AI voice response client device may send the voice command to a corresponding AI back-end service for execution and receive an execution result in return. Alternatively, the second AI voice response client device may execute the voice command locally. The second AI voice response client device may then send the execution result or an indication thereof to the first AI voice response client device for presentation to the user via the first AI voice response client device. Referring again to the example use case scenario introduced earlier, a user may submit a voice command to a friend's smartphone to determine the next appointment on the user's calendar. The friend's smartphone may relay the voice command to the user's smartphone located in another room that is out of voice communication range from the user but within network communication range of the friend's smartphone. The user's smartphone may receive the voice command and potentially communicate with a corresponding AI back-end service to which the user is known to determine the user's next calendar appointment. The second AI voice response client device may then send information indicative of the user's next calendar appointment to the friend's smartphone such that the information can be presented to the user via a display of the friend's smartphone or outputted via a speaker of the friend's smartphone.

In example embodiments, the second AI voice response client device may send the results of executing the voice command in an encrypted message to the first AI voice response client device. The first AI voice response client device may then authenticate the user prior to decrypting the message and displaying or otherwise outputting the execution result to the user. For instance, the user may be prompted for voice input that the first AI voice response client device may then compare using voice pattern recognition to the voice signature previously generated to authenticate the user.

In certain other example embodiments, upon receiving a response from the second AI voice response client device indicating that the user who submitted the voice command is a user known to the second AI back-end service accessible via the second AI voice response client device, the first AI voice response client device at which the voice command was received may execute the voice command to obtain the execution result and present the execution result to the user. Thus, in such example embodiments, the first AI voice response client device may proceed with execution of the voice command upon receiving authorization from the second AI voice response client device in the form of a response indicating that the user who submitted the voice command is a known user. In example embodiments, depending on the nature of the voice command, the first AI voice response client device may be able to communicate with the first AI back-end service to execute the voice command. For example, the voice command may correspond to a request for content capable of being streamed by the first AI voice response client device from the first AI back-end service. In other example embodiments, the first AI voice response client device may be capable of communicating directly with the second AI back-end service to which the user is known to execute the voice command.

Example embodiments provide various technical features, technical effects, and improvements to computer technology. Example embodiments provide the technical effect of seamlessly handling the execution of a user's voice command inputted to an AI voice response client device to which the user is unknown. This technical effect is achieved, at least in part, by the technical features of broadcasting, by an AI voice response client device that receives a voice command from an unknown user, to one or more other AI voice response client devices, a message that contains identifying information of the user such as a voice signature generated from the user's voice command. This technical effect is further achieved, at least in part, by the technical features of relaying the voice command to an AI voice response client device that responds to the broadcasted message, where such response indicates that the user is known to the responding AI voice response client device; having the AI voice response client device that receives the relayed voice command execute the voice command (or send the voice command to a corresponding AI back-end service for execution); and having the execution result sent back to the AI voice response client device that originally received the voice command from the user for presentation to the user via that device. This technical effect is further achieved, at least in part, by providing a selection algorithm for selecting a particular device to respond to the broadcasted message that is executable by either the device that relays the voice command or that is executable in a collaborative manner by multiple devices that receive the broadcasted message and to which the user is known. The above-described technical effect and the technical features of example embodiments of the invention that enable this technical effect constitute an improvement to computer technology and an improvement to the functioning of a computer. In particular, example embodiments enable an AI voice response client device to respond to a voice command from an unknown user, which represents a technical solution/improvement over conventional AI voice response systems.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
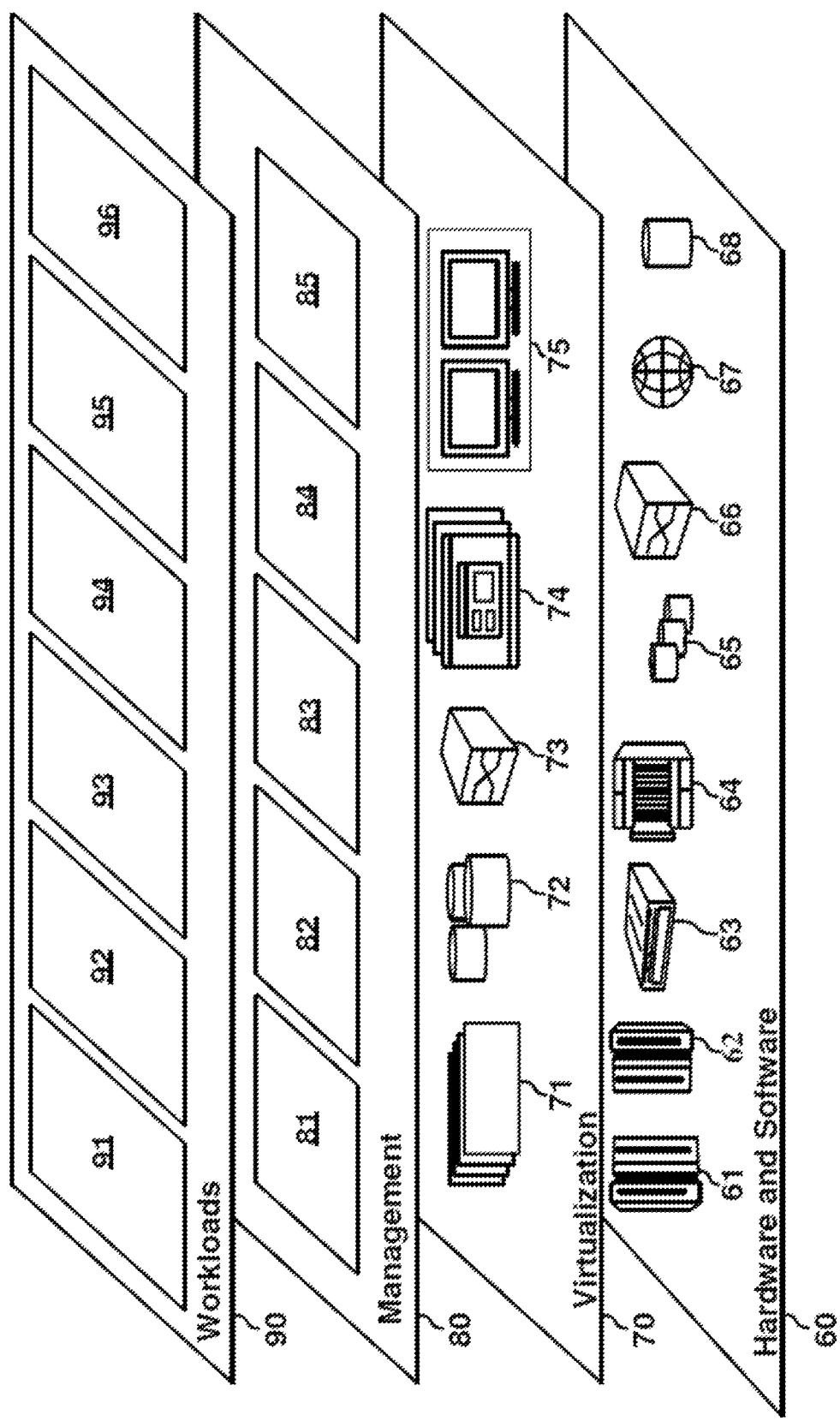
FIG. 2 depicts abstraction model layers in accordance with one or more example embodiments of the disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and voice command relaying 96.

Various illustrative methods and corresponding data structures associated therewith will now be described. It should be noted that each operation of the methods 400-500 may be performed by one or more of the program modules or the like depicted in FIG. 1 or 6, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 3A:
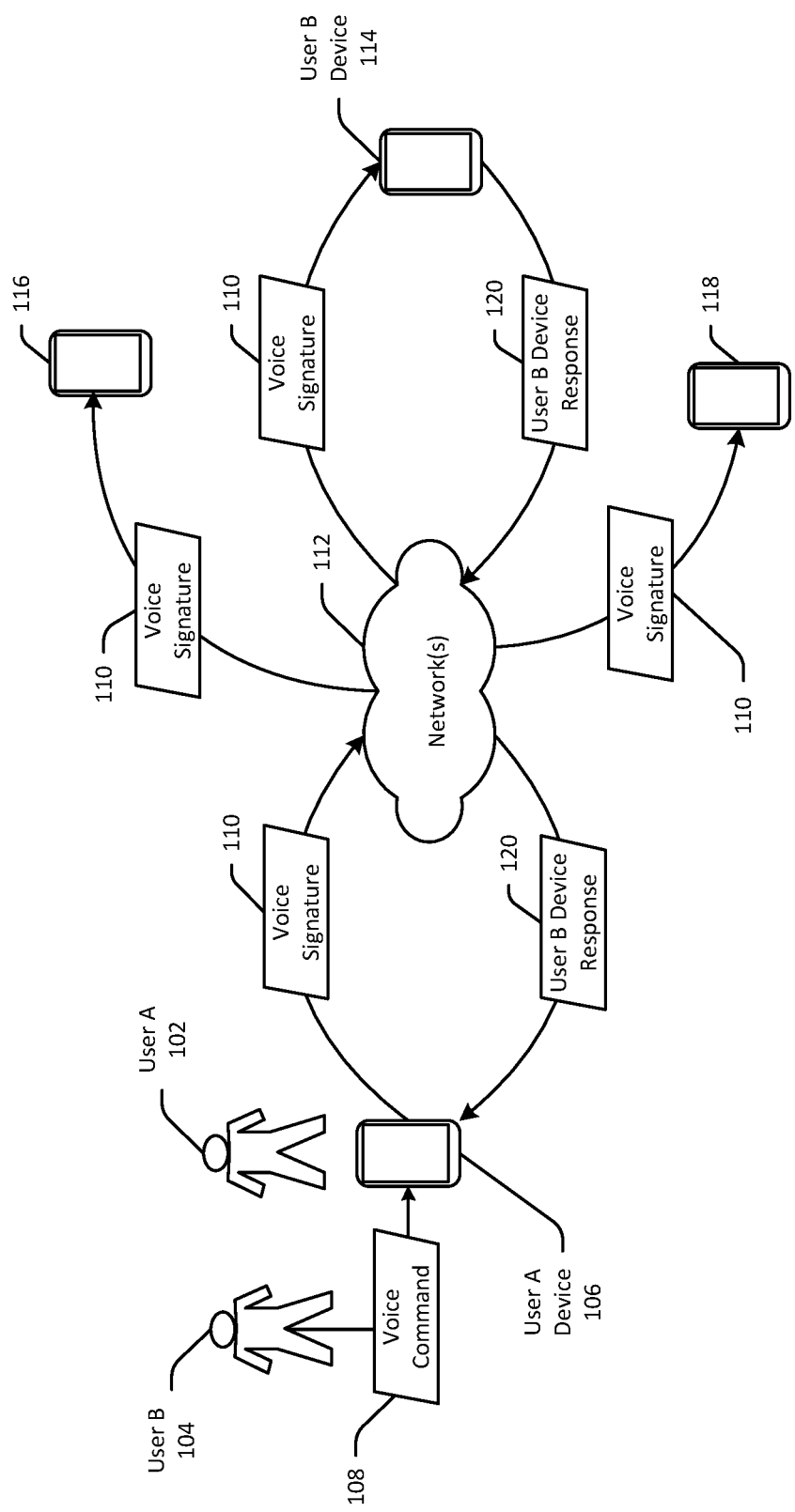
FIG. 3A is a schematic diagram illustrating the broadcasting of identifying information of an unknown user by an AI voice response client device to a plurality of other AI voice response client devices in accordance with one or more example embodiments.
Figure 3B:
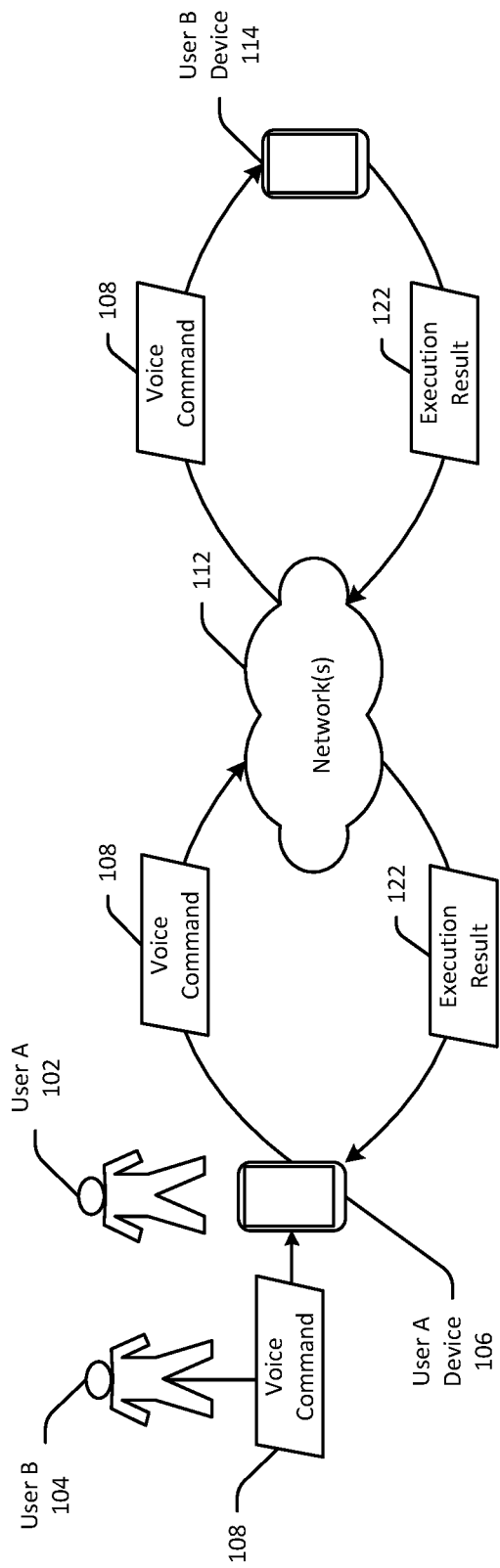
FIG. 3B is a schematic diagram illustrating the relaying of a voice command from a first AI voice response client device to a second AI voice response client device in accordance with one or more example embodiments.
Figure 4:
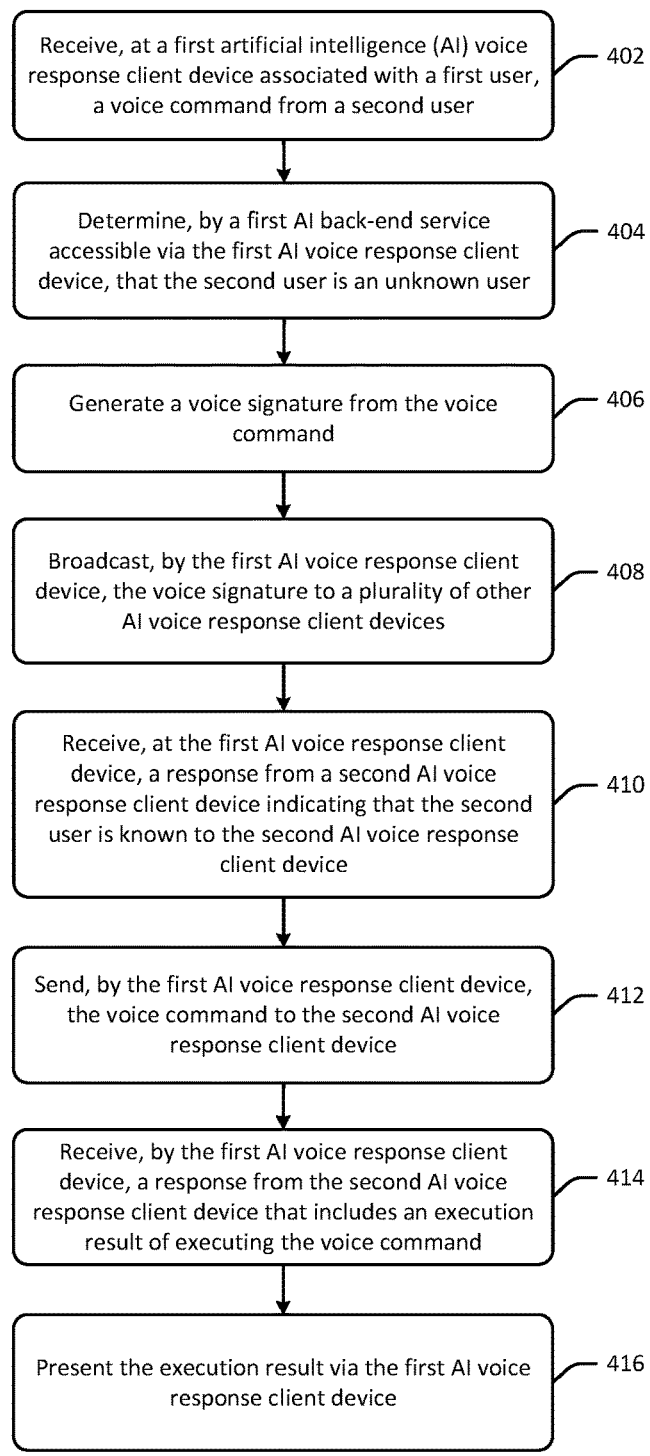
FIG. 4 is a process flow diagram of an illustrative method for determining that a user from whom a voice command is received at a first AI voice response client device is unknown to a first AI back-end service associated with the first AI voice response client device, identifying a second AI voice response client device associated with a second AI back-end service to which the user is known, and relaying the voice command from the first AI voice response client device to the second AI voice response client device in accordance with one or more example embodiments.

FIG. 3A is a schematic diagram illustrating the broadcasting of identifying information of an unknown user by an AI voice response client device to a plurality of other AI voice response client devices in accordance with one or more example embodiments. FIG. 3B is a schematic diagram illustrating the relaying of a voice command from a first AI voice response client device to a second AI voice response client device in accordance with one or more example embodiments. FIG. 4 is a process flow diagram of an illustrative method 400 for determining that a user from whom a voice command is received at a first AI voice response client device is unknown to a first AI back-end service associated with the first AI voice response client device, identifying a second AI voice response client device associated with a second AI back-end service to which the user is known, and relaying the voice command from the first AI voice response client device to the second AI voice response client device in accordance with one or more example embodiments. FIG. 4 will be described in conjunction with FIGS. 3A and 3B hereinafter.

FIG. 3A depicts an environment in which a first user 102 (User A) and a second user 104 (User B) are present. A first AI voice response client device 106 may be associated with User A 102. More specifically, the first AI voice response client device 106 may be configured to communicate with an AI back-end service (not shown in FIG. 3A) with which User A 102 has a registered user profile. As such, User A 102 may be a known user to the first AI voice response client device 106 and the corresponding AI back-end service with which User A 102 has a registered profile. In example embodiments, User B 104 is an unknown user to the first AI voice response client device 106 because User B 104 is not registered with the corresponding back-end service. In addition, User B 104 may be outside of a voice communication range from any AI voice response client device to which User B 104 is known, but within voice communication range of the first AI voice response client device 106. As such, in example embodiments, User B 104 submits a voice command 108 to the first AI voice response client device 106 instead.

Figure 6:
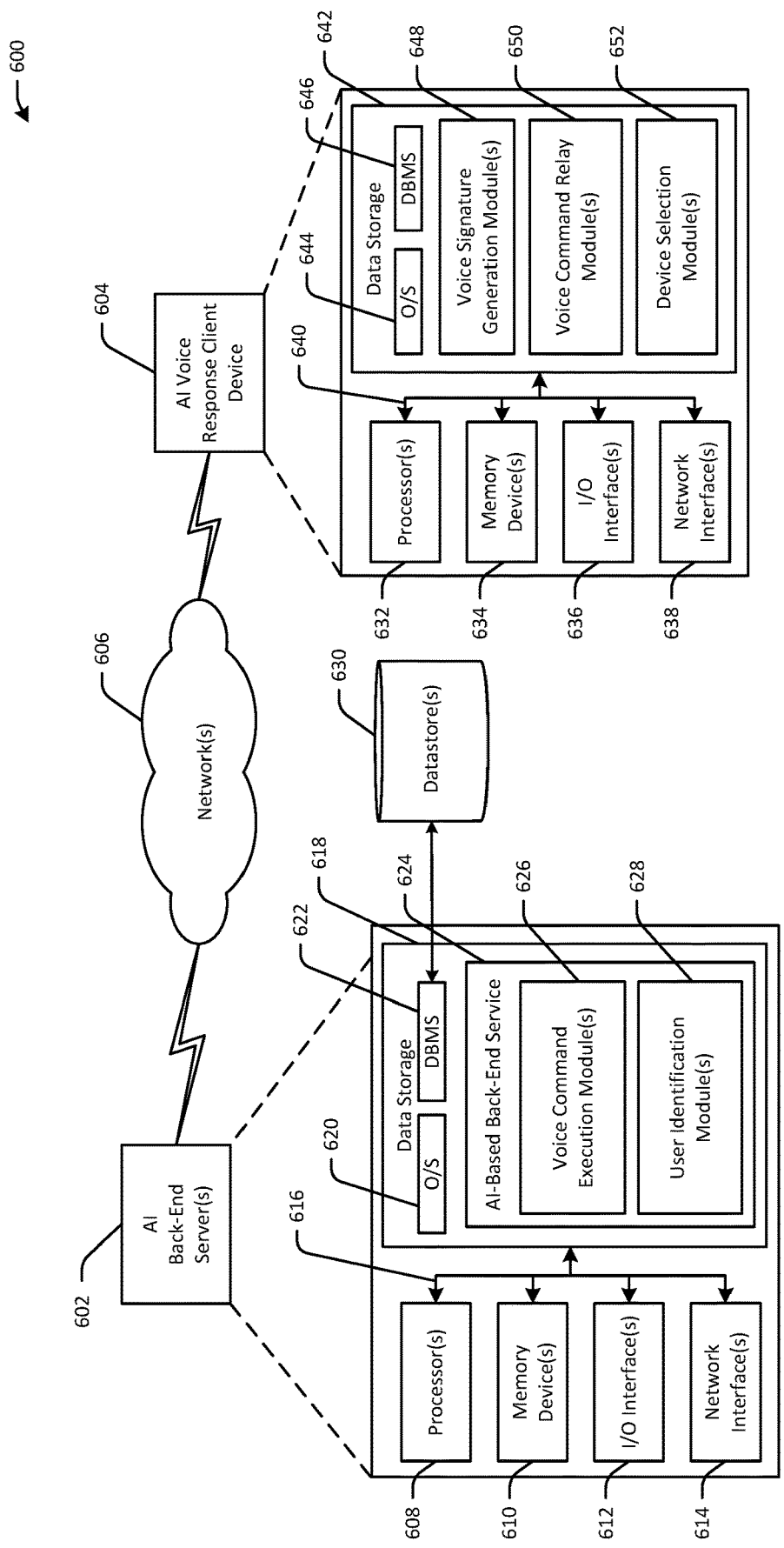
FIG. 6 is a schematic diagram of an illustrative networked architecture configured to implement one or more example embodiments.

Any AI voice response client device described herein and a corresponding AI back-end service with which such a client device is configured to communicate may form part of an AI voice response system in accordance with example embodiments. An AI back-end service may execute on one or more AI back-end servers (FIG. 6, 602). An AI voice response client device in accordance with example embodiments may be any suitable device capable of receiving voice input and providing voice output. As such, an AI voice response client device may include one or more microphones for capturing voice input data and one or more speakers for providing voice output. An AI voice response client device may also include a display for displaying image data, video data, graphics, text, or the like. In addition, an AI voice response client device may include any of a variety of sensors such as image sensor(s), inertial sensor(s), or the like.

Referring now to FIG. 4 in conjunction with FIG. 3A, at block 402 of the method 400, the first AI voice response client device 106 may receive the voice command 108 from User B 104. At block 404 of the method 400, the first AI voice response client device 106 may communicate the voice command 108 (or some snippet thereof) to a first AI back-end service, which in example embodiments, determines that User B 104 is not known to the first AI back-end service. In example embodiments, the first AI back-end service determines that User B 104 is an unknown user by executing computer-executable instructions of one or more user identification modules to compare the voice command 108 or voice snippet received from the first AI voice response client device 106 to voice patterns stored in association with registered user profiles. Based on this comparison, the first AI back-end service determines, in example embodiments, that there is no stored voice pattern that matches the voice pattern of the received voice input. Thus, the first AI back-end service determines that User B 104 does not have a registered user profile with the first AI back-end service and communicates that User B 104 is an unknown user to the first AI voice response client device 106. Alternatively, in example embodiments, the first AI voice response client device 106 may make the determination that User B 104 is an unknown user locally.

At block 406 of the method 400, in example embodiments, the first AI voice response client device 106 executes computer-executable instructions of one or more voice signature generation modules to generate a voice signature 110 from the voice command 108. The voice signature 110 may be a snippet of the voice command 108 that includes enough voice data to identify a voice pattern of User B 104 and distinguish that voice pattern from the voice patterns of other users.

At block 408 of the method 400, the first AI voice response client device 106 may broadcast the voice signature 110 to a plurality of other AI voice response client devices such as devices 114, 116, and 118. In example embodiments, the first AI voice response client device 106 sends the voice signature 110 to the other AI voice response devices via one or more networks 112, which may include any suitable public and/or private network(s). In example embodiments, the first AI voice response client device 106 may send the voice signature 110 according to a WiFi communication protocol, a Bluetooth communication protocol, or the like. In example embodiments, the first AI voice response client device 106 may broadcast a message that contains the voice signature 110. In other example embodiments, the first AI voice response client device 106 may include another form of identifying information for User B 104 in the broadcasted message in lieu of or in addition to the voice signature 110. For instance, the first AI voice response client device 106 may prompt User B 104 for her name or the like and may include this identifying information in the broadcasted message.

At block 410 of the method 400, the first AI voice response client device 106 may receive a response 120 from a second AI voice response client device 114 indicating that User B 104 is known to the second AI voice response client device 114. In particular, in example embodiments, each of the other AI voice response client devices 114, 116, and 118 that are within communication range of the first AI voice response client device 106 receives the broadcasted message and communicates with a respective AI back-end service to attempt to identify a user corresponding to the voice signature 110 or other identifying information included in the broadcasted message.

As similarly described earlier, each such AI back-end service may execute computer-executable instructions of one or more user identification modules to determine whether there exists a stored voice pattern associated with a registered user profile that matches the voice pattern of the voice signature 110. The example method 400 assumes, for ease of explanation, that User B 104 is known to a single device (e.g., device 114) among the devices that receive the broadcasted message. An example method 500 depicted in FIG. 5—which will be described in more detail later in this disclosure—relates to an example scenario in which User B 104 is known to multiple AI voice response client devices that receive the broadcasted message.

Referring now to FIG. 4 in conjunction with FIG. 3B, at block 412 of the method 400, in example embodiments, the first AI voice response client device 106 executes computer-executable instructions of one or more voice command relay modules to relay the voice command 108 to the second AI voice response client device 114 associated with User B 104 via the network(s) 112. Upon receipt of the voice command 108, the second AI voice response client device 114 may send the voice command 108 or some indication thereof to a corresponding second AI back-end service to which User B 104 is known.

The second AI back-end service may execute computer-executable instructions of one or more voice command execution modules to execute the voice command 108 (i.e., execute an action corresponding to the voice command) and obtain an execution result 122. The second AI back-end service may send the execution result 122 to the second AI voice response client device 114, which may, in turn, send the execution result 122 to the first AI voice response client device 106 via the network(s) 112. The first AI voice response client device 106 may receive the execution result 122 at block 414 of the method 400. Then, at block 416 of the method 400, the first AI voice response client device 106 may present the execution result 122 to User B 104. The execution result 122 may be presented via the first AI voice response client device 106 in any suitable manner including, without limitation, by displaying the result 122 on a display of the first AI voice response client device 106, outputting the execution result 122 via one or more speakers of the first AI voice response client device 106, or the like.

In example embodiments, the second AI voice response client device 114 may send the execution result 122 in an encrypted message to the first AI voice response client device 106. The first AI voice response client device 106 may then authenticate User B 104 prior to decrypting the message and displaying or otherwise outputting the execution result 122 to User B. For instance, User B 104 may be prompted for voice input that the first AI voice response client device 106 may then compare using voice pattern recognition to the voice signature 110 previously generated to authenticate User B 104. In this manner, the first AI voice response client device 106 can avoid outputting the execution result 122 if User B is no longer present in proximity to the device 106, thereby providing added data security.

Figure 5:
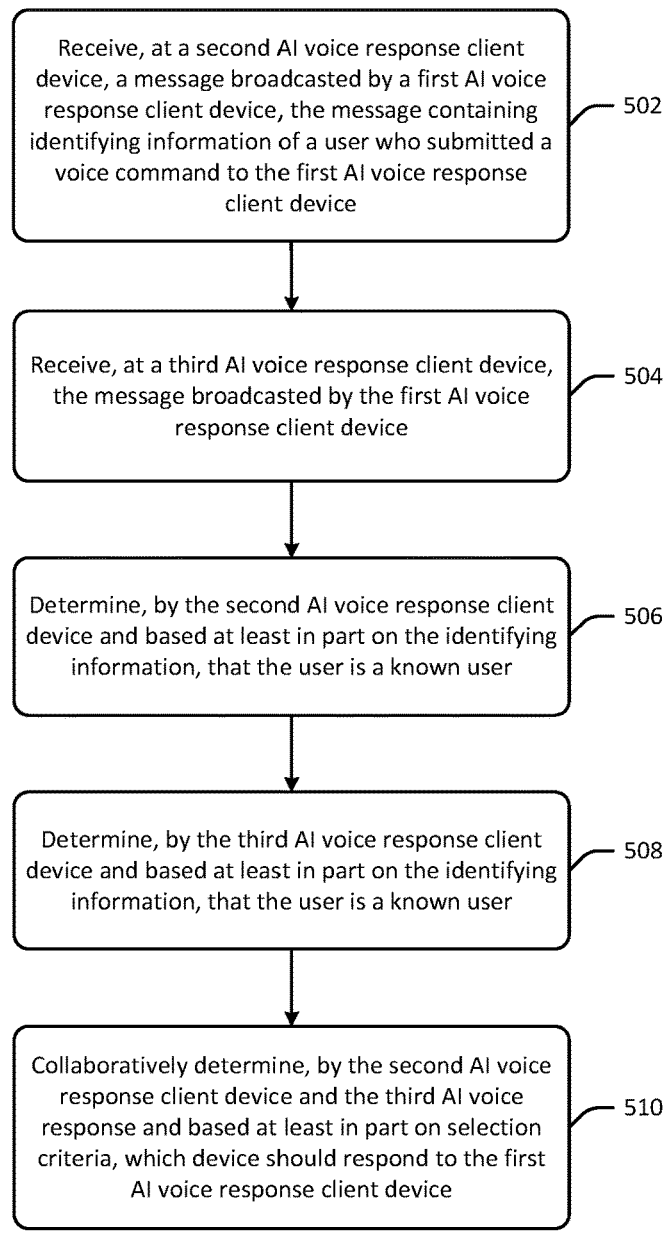
FIG. 5 is a process flow diagram of an illustrative method for collaboratively determining, by a plurality of AI voice response client devices, which client device should respond—to a broadcasted message received by the plurality of AI voice response client devices—with an indication that a user who submitted a voice command is known to respective AI back-end services associated with the plurality of AI voice response client devices in accordance with one or more example embodiments.

FIG. 5 is a process flow diagram of an illustrative method 500 for collaboratively determining, by a plurality of AI voice response client devices (e.g., device 114 and device 116), which client device should respond to the message broadcasted by the first AI voice response client device 106 with an indication that User B 104 (who submitted the voice command 108) is known to respective AI back-end services associated with the plurality of AI voice response client devices. In example embodiments, where there are multiple AI voice response client devices to which User B 104 is known, only one device may respond back to the first AI voice response client device 106.

At block 502 of the method 500, the second AI voice response client device 114 may receive the message broadcasted by the first AI voice response client device 106 that includes the voice signature 110 or other identifying information for User B 104. Similarly, at block 504 of the method 500, a third AI voice response client device 116 may receive the message broadcasted by the first AI voice response client device 106. At block 506 of the method 500, the second AI voice response client device 114 may determine that User B 104 is a known user based at least in part on the identifying information (e.g., the voice signature 110) contained in the broadcasted message. As previously described, the second AI voice response client device 114 may make this determination locally or may send the identifying information to a corresponding AI back-end service configured to perform the user identification. As previously described, the back-end service may identify User B 104 by comparing the received identifying information to stored identifying information associated with registered user profiles. Similarly, at block 508 of the method 500, the third AI voice response client device 116 may also determine that User B 104 is a known user.

Then, at block 510 of the method 500, the second AI voice response client device 114 and the third AI voice response client device 116 may collaboratively determine which device should respond to the first AI voice response client device 106 with an indication that User B 104 is a known user. More specifically, each of the second AI voice response client device 114 and the third AI voice response client device 116 may execute respective device selection module(s) to collaboratively determine based on selection criteria which device to select for responding back to the broadcasted message. In example embodiments, the selection criteria may specify a default device for responding to the broadcasted message. For instance, the second AI voice response client device 114 may be the default AI voice response client device for responding to the broadcasted message. In other example embodiments, the selection criteria may dictate that the device with the smallest network latency or the device with the lowest network communication cost (e.g., cellular network data charges) is the device to select for responding to the broadcasted message.

In other example embodiments, the device that broadcasts the message (e.g., the first AI voice response client device 106) may select a device to receive the voice command 108 for execution from among multiple AI voice response devices that respond to the broadcasted message. For instance, in example embodiments, both the second AI voice response client device 114 and the third voice response client device 116 may respond to the first AI voice response client device 106 indicating that User B 104 is known to both device 114 and device 116. Similar to the collaborative determination described above among devices that receive the broadcasted message, the broadcasting device (e.g., the first AI voice response device 106) may select a particular device (e.g., the second AI voice response device 114) to receive the voice command 108 based on selection criteria, which may include, without limitation, selection of a default device or selection of a device that is most proximal to the broadcasting device.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

FIG. 6 is a schematic diagram of an illustrative networked architecture 600 configured to implement one or more example embodiments of the disclosure. The networked architecture 600 may include one or more AI back-end servers 602 configured to execute an AI back-end service 624. The AI back-end server(s) 602 may be configured to communicate via one or more networks 606 with one or more voice response client devices 604 which may include any suitable device including, without limitation, a voice-enabled device not intended for mobile use, a tablet, a smartphone, a wearable device, a personal computer, or the like. While any particular component of the networked architecture 600 may be described herein in the singular, it should be appreciated that multiple instances of any such component may be provided, and functionality described in connection with a particular component may be distributed across multiple ones of such a component.

The network(s) 606 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the AI back-end server 602 may include one or more processors (processor(s)) 608, one or more memory devices 610 (generically referred to herein as memory 610), one or more input/output ("I/O") interface(s) 612, one or more network interfaces 614, and data storage 618. The AI back-end server 602 may further include one or more buses 616 that functionally couple various components of the AI back-end server 602.

The bus(es) 616 may include at least one of a system bus, a memory bus, an address bus, or a message bus, and may permit the exchange of information (e.g., data (including computer-executable code), signaling, etc.) between various components of the AI back-end server 602. The bus(es) 616 may include, without limitation, a memory bus or a memory controller, a peripheral bus, an accelerated graphics port, and so forth. The bus(es) 616 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 610 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 610 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 610 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 618 may include removable storage and/or non-removable storage including, but not limited to, magnetic storage, optical disk storage, and/or tape storage. The data storage 618 may provide non-volatile storage of computer-executable instructions and other data. The memory 610 and the data storage 618, removable and/or non-removable, are examples of computer-readable storage media (CRSM) as that term is used herein.

The data storage 618 may store computer-executable code, instructions, or the like that may be loadable into the memory 610 and executable by the processor(s) 608 to cause the processor(s) 608 to perform or initiate various operations. The data storage 618 may additionally store data that may be copied to memory 610 for use by the processor(s) 608 during the execution of the computer-executable instructions. Moreover, output data generated as a result of execution of the computer-executable instructions by the processor(s) 608 may be stored initially in memory 610 and may ultimately be copied to data storage 618 for non-volatile storage.

More specifically, the data storage 618 may store one or more operating systems (O/S) 620; one or more database management systems (DBMS) 622 configured to access the memory 610 and/or one or more external datastores 630; and one or more program modules, applications, engines, managers, computer-executable code, scripts, or the like such as, for example, one or more voice command execution modules 626 and one or more user identification modules 628. Each of the aforementioned modules may form part of the AI back-end service 624. Any of the components depicted as being stored in data storage 618 may include any combination of software, firmware, and/or hardware. The software and/or firmware may include computer-executable instructions (e.g., computer-executable program code) that may be loaded into the memory 610 for execution by one or more of the processor(s) 608 to perform any of the operations described earlier in connection with correspondingly named modules/services.

Although not depicted in FIG. 6, the data storage 618 may further store various types of data utilized by components of the AI back-end server 602 (e.g., data stored in the datastore(s) 630). Any data stored in the data storage 618 may be loaded into the memory 610 for use by the processor(s) 608 in executing computer-executable instructions. In addition, any data stored in the data storage 618 may potentially be stored in the external datastore(s) 630 and may be accessed via the DBMS 622 and loaded in the memory 610 for use by the processor(s) 608 in executing computer-executable instructions.

The processor(s) 608 may be configured to access the memory 610 and execute computer-executable instructions loaded therein. For example, the processor(s) 608 may be configured to execute computer-executable instructions of the various program modules, applications, engines, managers, or the like of the AI back-end server 602 to cause or facilitate various operations to be performed in accordance with one or more embodiments of the disclosure. The processor(s) 608 may include any suitable processing unit capable of accepting data as input, processing the input data in accordance with stored computer-executable instructions, and generating output data. The processor(s) 608 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 608 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 608 may be capable of supporting any of a variety of instruction sets.

Referring now to other illustrative components depicted as being stored in the data storage 618, the O/S 620 may be loaded from the data storage 618 into the memory 610 and may provide an interface between other application software executing on the AI back-end server 602 and hardware resources of the AI back-end server 602. More specifically, the O/S 620 may include a set of computer-executable instructions for managing hardware resources of the AI back-end server 602 and for providing common services to other application programs. In certain example embodiments, the O/S 620 may include or otherwise control the execution of one or more of the program modules, engines, managers, or the like depicted as being stored in the data storage 618. The O/S 620 may include any operating system now known or which may be developed in the future including, but not limited to, any server operating system, any mainframe operating system, or any other proprietary or non-proprietary operating system.

The DBMS 622 may be loaded into the memory 610 and may support functionality for accessing, retrieving, storing, and/or manipulating data stored in the memory 610, data stored in the data storage 618, and/or data stored in external datastore(s) 630. The DBMS 622 may use any of a variety of database models (e.g., relational model, object model, etc.) and may support any of a variety of query languages. The DBMS 622 may access data represented in one or more data schemas and stored in any suitable data repository. Data stored in the datastore(s) 630 may include, for example, voice signatures, registered user profiles, and so forth. External datastore(s) 630 that may be accessible by the AI back-end server 602 via the DBMS 622 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the AI back-end server 602, the input/output (I/O) interface(s) 612 may facilitate the receipt of input information by the AI back-end server 602 from one or more I/O devices as well as the output of information from the AI back-end server 602 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the AI back-end server 602 or may be separate. The I/O devices may further include, for example, any number of peripheral devices such as data storage devices, printing devices, and so forth.

The I/O interface(s) 612 may also include an interface for an external peripheral device connection such as universal serial bus (USB), FireWire, Thunderbolt, Ethernet port or other connection protocol that may connect to one or more networks. The I/O interface(s) 612 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The AI back-end server 602 may further include one or more network interfaces 614 via which the AI back-end server 602 may communicate with any of a variety of other systems, platforms, networks, devices, and so forth. The network interface(s) 614 may enable communication, for example, with one or more other devices via one or more of the network(s).

In an illustrative configuration, a voice response client device 604 (e.g. any of the voice response client devices depicted in FIGS. 3A and 4B) may include one or more processors (processor(s)) 632, one or more memory devices 634 (generically referred to herein as memory 634), one or more input/output ("I/O") interface(s) 636, one or more network interfaces 638, and data storage 642. The voice response client device 604 may further include one or more buses 640 that functionally couple various components of the voice response client device 604.

The bus(es) 640 may include any of the types of buses described in connection with the bus(es) 616 of the AI back-end server 602. Similarly, the processor(s) 632 may include any of the types of processors described in connection with the processor(s) 608; the memory 634 may include any of the types of memory described in connection with the memory 610; the data storage 642 may include any of the types of data storage described in connection with the data storage 618; the I/O interface(s) 636 may include any of the types of interfaces and may utilize any of the types of I/O devices described in connection with the I/O interface(s) 612; and the network interface(s) 638 may include any of the types of interfaces described in connection with the network interface(s) 614.

The data storage 642 may store one or more operating systems (0/S) 644 (which may include any of the types of operating systems described in connection with the O/S 620); one or more database management systems (DBMS) 646 (which may include any of the types of database management systems described in connection with the DBMS 622) configured to access the memory 634, and potentially, the datastore(s) 630; and one or more program modules, applications, engines, managers, computer-executable code, scripts, or the like such as, for example, one or more voice signature generation modules 648, one or more voice command relay modules 650, and one or more device selection modules 652. Any of the components depicted as being stored in data storage 618 may include any combination of software, firmware, and/or hardware. The software and/or firmware may include computer-executable instructions (e.g., computer-executable program code) that may be loaded into the memory 634 for execution by one or more of the processor(s) 632 to perform any of the operations described earlier in connection with correspondingly named modules/services.

Although not depicted in FIG. 6, the data storage 642 may further store various types of data utilized by components of the voice response client device 604. Any data stored in the data storage 642 may be loaded into the memory 634 for use by the processor(s) 632 in executing computer-executable instructions. In addition, any data stored in the data storage 642 may potentially be stored in the external datastore(s) 630 and may be accessed via the DBMS 646 and loaded in the memory 634 for use by the processor(s) 632 in executing computer-executable instructions.

It should be appreciated that the program modules depicted in FIG. 6 as being stored in the data storage 618 or the data storage 642 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the AI back-end server 602 or the voice response client device 604 and/or other computing devices accessible via the network(s) 606, may be provided to support functionality provided by the modules depicted in FIG. 6 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 6 may be implemented, at least partially, in hardware and/or firmware across any number of devices.

It should further be appreciated that the AI back-end server 602 and/or the voice response client device 604 may include alternate and/or additional hardware, software, or firmware components beyond those described or depicted without departing from the scope of the disclosure. More particularly, it should be appreciated that software, firmware, or hardware components depicted as forming part of the AI back-end server 602 and/or the voice response client device 604 are merely illustrative and that some components may not be present or additional components may be provided in various embodiments. While various illustrative modules have been depicted and described as software modules stored in the data storage 618 or the data storage 642, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of any of the methods 400-500 may be performed by an AI voice response client device 604 and/or an AI back-end server 602 having the illustrative configurations depicted in FIG. 6, or more specifically, by one or more program modules, engines, applications, or the like executable on such devices. It should be appreciated, however, that such operations may be implemented in connection with numerous other device configurations.

The operations described and depicted in the illustrative methods of FIGS. 4 and 5 may be carried out or performed in any suitable order as desired in various exemplary embodiments of the disclosure. Additionally, in certain example embodiments, at least a portion of the operations may be carried out in parallel. Furthermore, in certain example embodiments, less, more, or different operations than those depicted in FIGS. 4 and 5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for relaying a voice command between artificial intelligence (AI) voice response systems, the method comprising:
   receiving, at a first AI voice response client device, the voice command from a user;
   determining, by the first AI voice response client device, that the user is unknown to a first AI back-end service accessible via the first AI voice response client device;
   broadcasting, by the first AI voice response client device, a message comprising identifying information of the user;
   receiving, by the first AI voice response client device, a response to the message from a second AI voice response client device, the response to the message comprising an indication that the user is known to a second AI back-end service accessible via the second AI voice response client device;
   sending, by the first AI voice response client device, the voice command to the second AI voice response client device for execution by the second AI back-end service;
   receiving, by the first AI voice response client device from the second AI voice response client device, an execution result of executing the voice command; and
   presenting the execution result to the user via the first AI voice response client device.

2. The computer-implemented method of claim 1, wherein the broadcasted message is received by a plurality of AI voice response client devices within a communication range of the first AI voice response client device, the plurality of AI voice response client devices comprising the second AI voice response client device.

3. The computer-implemented method of claim 2, wherein the response to the message is a first response, the method further comprising:
   receiving, by the first AI voice response client device, a second response to the message from a third AI voice response client device, the second response to the message comprising an indication that the user is known to a third AI back-end service accessible via the third AI voice response client device;
   determining, by the first AI voice response client device, that the second AI voice response client device is more proximal to the first AI voice response client device than the third AI voice response client device; and
   selecting, by the first AI voice response client device, the second AI voice response client device for receiving the voice command.

4. The computer-implemented method of claim 2, wherein the user is known to a third AI back-end service accessible via a third AI voice response client device of the plurality of AI voice response client devices, and wherein the second AI voice response client device and the third AI voice response client device collaboratively determine, based at least in part on one or more selection criteria, that the second AI voice response client device should send the response to the message to the first AI voice response client device.

5. The method of claim 4, wherein the one or more selection criteria comprise at least one of: an indication of a default AI voice response client device for receiving the voice command, a cost of network communication, or a network latency.

6. The computer-implemented method of claim 1, further comprising generating a voice signature associated with the user from the voice command, wherein the identifying information of the user comprises the voice signature.

7. The computer-implemented method of claim 6, further comprising:
   receiving, by the first AI voice response client device from the second AI voice response client device, an encrypted message comprising the execution result;
   prompting, by the first AI voice response client device, the user for additional voice input;
   comparing, by the first AI voice response client device, the additional voice input to the voice signature to authenticate the user; and
   decrypting the encrypted message to obtain the execution result for presentation to the user via the first AI voice response client device.

8. The computer-implemented method of claim 1, wherein the voice command is a first voice command, the method further comprising:
   receiving, at the first AI voice response client device, a second voice command from the user;
   determining, by the first AI voice response client device and based at least in part on a response received from a third AI voice response client device, that the user is known to a third AI back-end service accessible via the third AI voice response client device;
   communicating, by the first AI voice response client device, with the first AI back-end service or the third AI back-end service to execute the voice command to obtain an execution result; and
   presenting the execution result to the user via the first AI voice response client device.

9. An artificial intelligence (AI) voice response system configured to relay a voice command to another (AI) voice response system, the system comprising:
   a first AI back-end service; and
   a first AI voice response client device configured to communicate with the first AI back-end service, the first AI voice response client device comprising:

at least one memory storing computer-executable instructions; and at least one processor, wherein the at least one processor is configured to access the at least one memory and execute the computer-executable instructions to:
receive the voice command from a user;
determine that the user is unknown to the first AI back-end service;
broadcast a message comprising identifying information of the user;
receive a response to the message from a second AI voice response client device, the response to the message comprising an indication that the user is known to a second AI back-end service accessible via the second AI voice response client device;
send the voice command to the second AI voice response client device for execution by the second AI back-end service;
receive, from the second AI voice response client device, an execution result of executing the voice command; and
present the execution result to the user.

10. The AI voice response system of claim 9, wherein the broadcasted message is received by a plurality of AI voice response client devices within a communication range of the first AI voice response client device, the plurality of AI voice response client devices comprising the second AI voice response client device.

11. The AI voice response system of claim 10, wherein the response to the message is a first response, and wherein the at least one processor is further configured to execute the computer-executable instructions to:
receive a second response to the message from a third AI voice response client device, the second response to the message comprising an indication that the user is known to a third AI back-end service accessible via the third AI voice response client device;
determine that the second AI voice response client device is more proximal to the first AI voice response client device than the third AI voice response client device; and
select the second AI voice response client device for receiving the voice command.

12. The AI voice response system of claim 10, wherein the user is known to a third AI back-end service accessible via a third AI voice response client device of the plurality of AI voice response client devices, and wherein the second AI voice response client device and the third AI voice response client device collaboratively determine, based at least in part on one or more selection criteria, that the second AI voice response client device should send the response to the message to the first AI voice response client device.

13. The AI voice response system of claim 12, wherein the one or more selection criteria comprise at least one of: an indication of a default AI voice response client device for receiving the voice command, a cost of network communication, or a network latency.

14. The AI voice response system of claim 9, wherein the at least one processor is further configured to execute the computer-executable instructions to generate a voice signature associated with the user from the voice command, wherein the identifying information of the user comprises the voice signature.

15. The AI voice response system of claim 14, wherein the at least one processor is further configured to execute the computer-executable instructions to:

receive, from the second AI voice response client device, an encrypted message comprising the execution result;
prompt the user for additional voice input;
compare the additional voice input to the voice signature to authenticate the user; and
decrypt the encrypted message to obtain the execution result for presentation to the user via the first AI voice response client device.

16. A computer program product for relaying a voice command between artificial intelligence (AI) voice response systems, the computer program product comprising a non-transitory storage medium readable by a processing circuit, the storage medium storing instructions executable by the processing circuit to cause a method to be performed, the method comprising:
receiving, at a first AI voice response client device, the voice command from a user;
determining, by the first AI voice response client device, that the user is unknown to a first AI back-end service accessible via the first AI voice response client device;
broadcasting, by the first AI voice response client device, a message comprising identifying information of the user;
receiving, by the first AI voice response client device, a response to the message from a second AI voice response client device, the response to the message comprising an indication that the user is known to a second AI back-end service accessible via the second AI voice response client device;
sending, by the first AI voice response client device, the voice command to the second AI voice response client device for execution by the second AI back-end service;
receiving, by the first AI voice response client device from the second AI voice response client device, an execution result of executing the voice command; and
presenting the execution result to the user via the first AI voice response client device.

17. The computer program product of claim 16, wherein the broadcasted message is received by a plurality of AI voice response client devices within a communication range of the first AI voice response client device, the plurality of AI voice response client devices comprising the second AI voice response client device.

18. The computer program product of claim 17, wherein the response to the message is a first response, the method further comprising:
receiving, by the first AI voice response client device, a second response to the message from a third AI voice response client device, the second response to the message comprising an indication that the user is known to a third AI back-end service accessible via the third AI voice response client device;
determining, by the first AI voice response client device, that the second AI voice response client device is more proximal to the first AI voice response client device than the third AI voice response client device; and
selecting, by the first AI voice response client device, the second AI voice response client device for receiving the voice command.

19. The computer program product of claim 17, wherein the user is known to a third AI back-end service accessible via a third AI voice response client device of the plurality of AI voice response client devices, wherein the second AI voice response client device and the third AI voice response client device collaboratively determine, based at least in part on one or more selection criteria, that the second AI voice response client device should send the response to the message to the first AI voice response client device, and wherein the one or more selection criteria comprise at least one of: an indication of a default AI voice response client device for receiving the voice command, a cost of network communication, or a network latency.

20. The computer program product of claim 16, the method further comprising generating a voice signature associated with the user from the voice command, wherein the identifying information of the user comprises the voice signature.

* * * * *